Oct. 30, 1962  J. GOMPPER  3,060,746
APPARATUS FOR SAMPLING GRANULAR OR POWDERY MATERIAL IN BULK
Filed Dec. 22, 1958  3 Sheets-Sheet 1

INVENTOR
Johannes Gompper
BY
Mead, Browne, Schuyler & Beveridge
ATTORNEYS

Oct. 30, 1962 J. GOMPPER 3,060,746
APPARATUS FOR SAMPLING GRANULAR OR POWDERY MATERIAL IN BULK
Filed Dec. 22, 1958 3 Sheets-Sheet 2
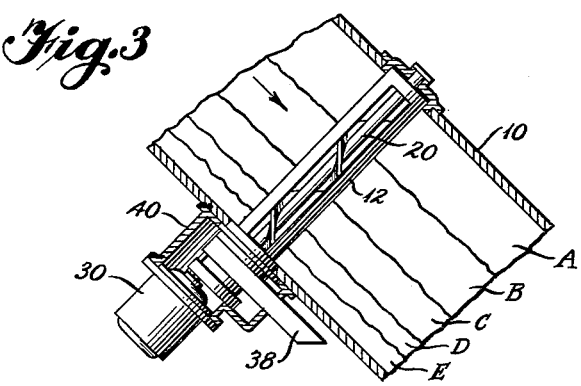
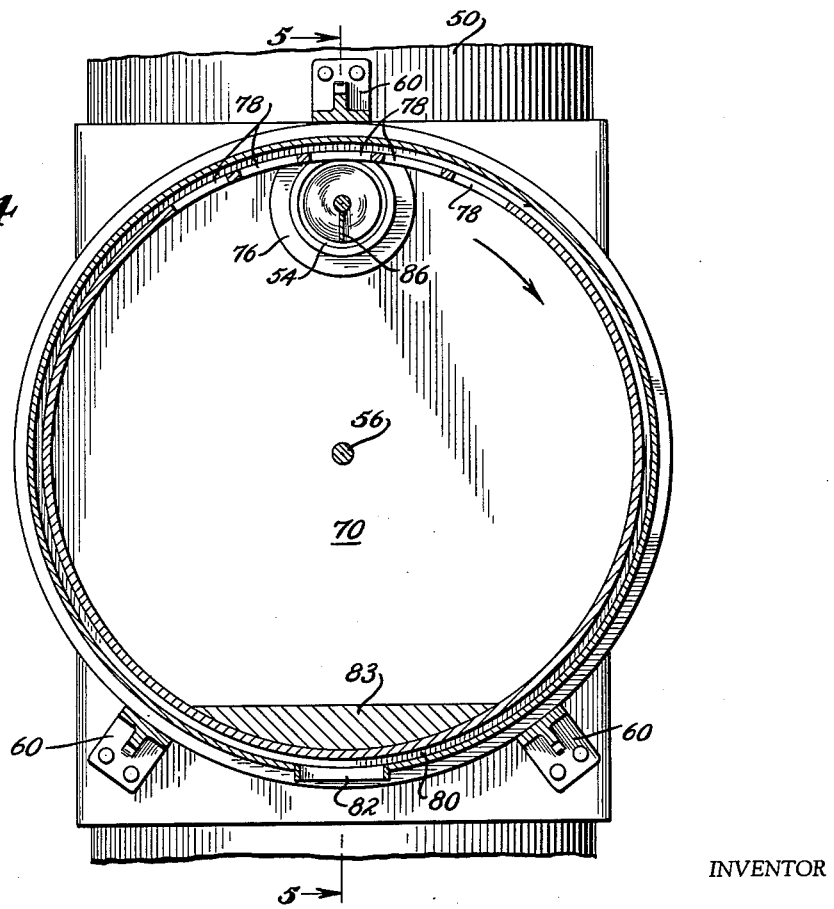
INVENTOR
Johannes Gompper
BY
Mead, Browne, Schuyler & Beveridge
ATTORNEYS

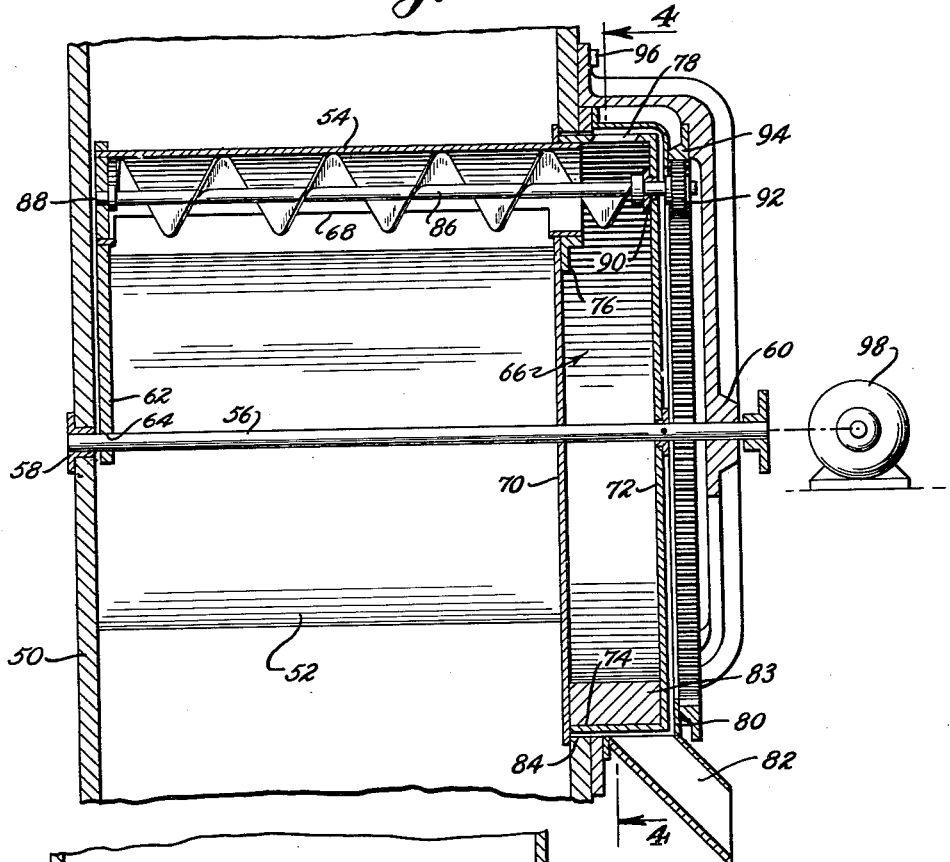

Patent text

3,060,746
APPARATUS FOR SAMPLING GRANULAR OR POWDERY MATERIAL IN BULK
Johannes Gompper, Grunstrasse 44, Saatenfachmann, Buderich, near Dusseldorf, Germany
Filed Dec. 22, 1958, Ser. No. 782,275
Claims priority, application Germany Jan. 2, 1958
3 Claims. (Cl. 73—422)

This invention relates to apparatus for sampling granular or powdery material in bulk, and more particularly to apparatus for obtaining a plurality of samples of such material from a flow of the material as during a transfer or dispensing operation.

Sampling devices of the type with which the present invention is concerned are employed to obtain an analysis of a large quantity or batch of granular or powdery material. In obtaining the analysis, a sampling device is located on a path through which the batch of material to be sampled flows, as for example, a chute or conduit along which the batch flows during transfer into or out of a bin or warehouse. As the batch of material flows along the path, the sampling device extracts a number of samples from the flowing material. This is usually accomplished by providing a small branch path leading off the main flow path and permitting small quantities of the flowing material to enter the branch path at timed intervals.

In order to obtain an accurate sample of the batch of material, it is necessary to make the operation of the sampler automatic and independent of manual influence.

Problems encountered in obtaining an accurate sample of the material arise from the fact that due to differing grain weights and surface conditions, the material tends to stratify itself in layers which have differing characteristics. As the material is drawn off from the bin, a mixing operation usually occurs and in general, it can be said that within the flow path, the material is non-homogeneous both in directions parallel and directions perpendicular to the direction of flow.

It is a primary object of this invention to provide apparatus for obtaining representative samples from a flow of granular or powdery material which is adapted to withdraw samples from the material in a manner such that the samples are truly representative of the characteristics of the entire batch of material.

Other objects and advantages of the invention will become readily apparent by reference to the following specification taken in conjunction with the accompanying drawings.

In the drawings:

FIG. 3 shows a sampling apparatus similar to the apparatus of FIGS. 1 and 2 mounted in a preferred relationship to the flow of material through a tube;

FIG. 4 is a transverse cross-sectional view of another form of sampling apparatus taken on the line 4—4 of FIG. 5;

FIG. 5 is a cross-sectional view of the apparatus of FIG. 4 taken on line 5—5 of FIG. 4; and FIG. 6 is a schematic illustration of the apparatus of FIGS. 4 and 5 in operation.

Figure 1:
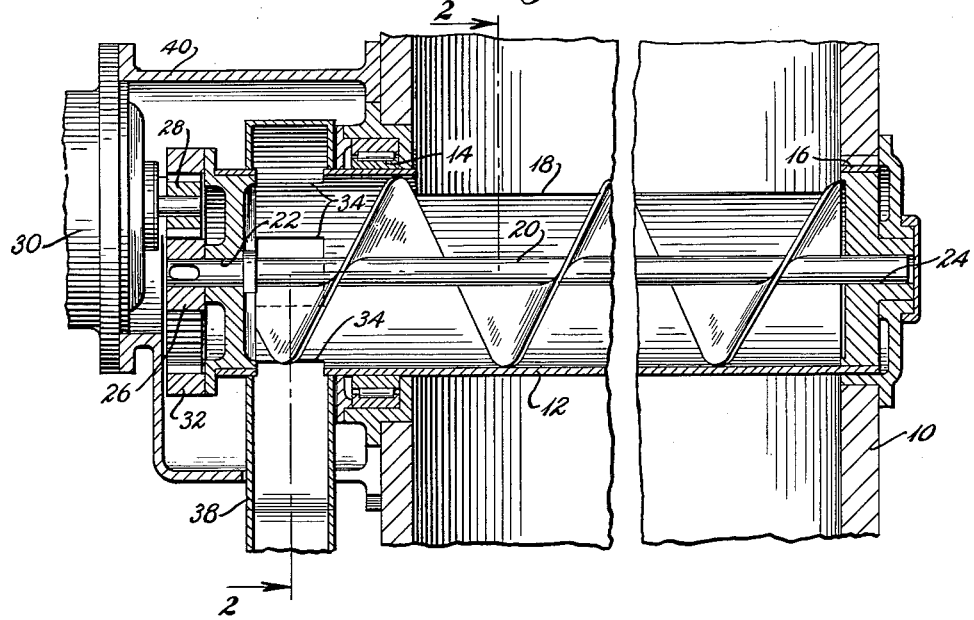
FIG. 1 is a longitudinal cross-sectional view taken through one form of sampling apparatus embodying the invention.
Figure 2:
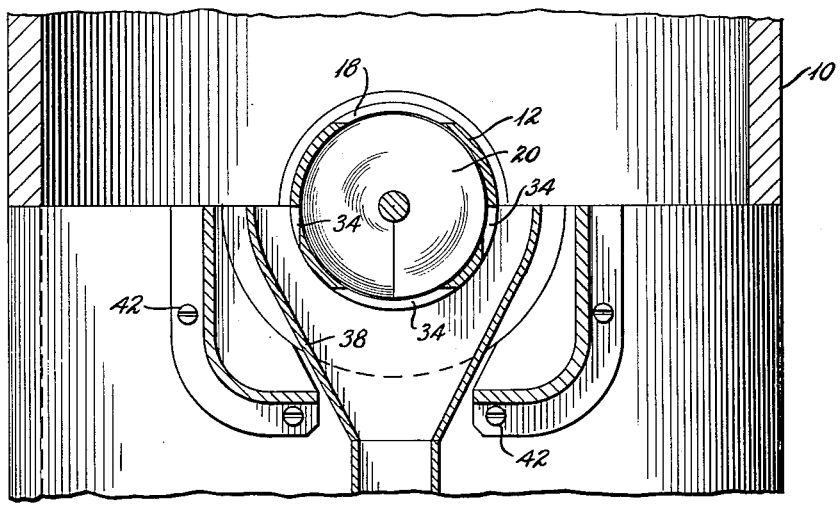
FIG. 2 is a transverse cross-sectional view of the apparatus of FIG. 1 taken on the line 2—2 of FIG. 1.

Referring first to FIGS. 1 and 2, one form of the invention is disclosed as being mounted within a tubular conduit 10 through which grain or other granular or powdery materials in bulk may flow, as during transfer to or from a storage bin. The conduit 10 may be so arranged as to permit a gravity flow of the material through the conduit or may be part of a pneumatic conveying system. A hollow receiving tube 12 extends diametrically across the interior of flow conduit 10 and is journaled for rotation in the walls of conduit 10 by bearing 14 and brushing assembly 16. Receiving tube 12 is formed with an axially extending materials receiving opening or slit 18 which extends entirely across the internal flow passage of conduit 10.

Receiving tube 12 forms the housing or casing for a conveying screw 20 which is mounted for rotation within tube 12 upon bearing members 22 and 24. Conveying screw 20 is driven in rotation by means of a gear 26 fixed to one end of the shaft of screw 20 which is meshed with a driving gear 28 driven by a motor 30.

Driving gear 28 is also meshed with a ring gear 32 which is fixedly coupled to receiving tube 12 through the bearing assembly 22 at the left hand end (FIG. 1) of conveying screw 20. As best seen in FIG. 1, receiving tube 12 is formed with discharge openings 34 located axially between bearing 14 and bearing assembly 22. Discharge openings 34 place the interior of receiving tube 12 in communication with the discharge housing or chute 38 whereby material may be conducted from the interior of tube 12. Preferably, a supporting framework 40 is employed to support motor 30 upon the side of conduit 10, framework 40 being secured to conduit 10 by any suitable means such as bolts 42 (FIG. 2).

Assuming a flow of granular or powdery material through conduit 10, the usual situation will find material within the conduit 10 disposed in layers having different characteristics in the manner illustrated by layers A, B, C, D and E in FIG. 3. To sample material flowing through conduit 10, motor 30 is actuated to drive gear 28. The meshing engagement between gear 28, ring gear 32 and gear 26 causes receiving tube 12 to be rotated in one direction as conveying screw is rotated in the opposite direction. The rotation of conveying screw 20 is selected to be such as to convey material within the receiving tube toward the discharge openings 34 at the left hand (FIG. 1) end of the tube 12. As receiving tube 12 is rotated, materials receiving opening 18 is likewise rotated through the flow path of material flowing through the conduit 10 from a position in which opening 18 faces the flow and a position where opening 18 is facing in the opposite direction and shielded from the flow by tube 12. During the period of time opening 18 faces upstream, material flowing through conduit 10 can pass through opening 18 into the interior of tube 12. When opening 18 is facing downstream of the flow of material, little or no material passes through opening 18 into the interior of tube 12. Material captured in the interior of tube 12 during each rotation of the tube is driven by conveying screw 20 into discharge chute 38 from which the material is collected for analysis.

The gear ratio between gears 8, 26 and 32 is preferably selected to be such that a sample collected during one rotation of receiving tube 12 is completely discharged from the interior of the tube prior to the collection of a sample during the next subsequent rotation of the tube 12. In accordance with the number of samples desired, motor 30 may be continuously rotated or provided with a suitable timing means (not shown) for intermittent single complete rotations at selected time intervals. Where intermittent rotation at selected time intervals is used, the rest position of opening 18 is selected to face downstream of the flow of material within conduit 10.

Because of the fact that materials receiving opening 18 extends entirely across the conduit, it is apparent from FIG. 3 that a representative sample of materials in proportion to their amounts in the various layers A, B, C, D and E is obtained.

An alternative form of sampling apparatus is disclosed in FIGS. 4 and 5. The embodiment of FIGS. 4 and 5 is especially designed to secure a sample representative of the composition of material which takes into account not only characteristics of the material which may vary across the flow path in directions parallel to the axis of rotation of the samples but also variations across the flow path in directions perpendicular to the axis of rotation of the samples.

Referring first to FIG. 5, a flow conduit or chute 50 is formed with a transversely extending cylindrical enlargement 52. The purpose of the enlargement 52 is to permit the rotation of a receiving tube 54 and its associated framework, to be described below, about an axis established by a shaft 56 journaled for rotation at one end in a bushing 58 and rotatably supported at its other end in a fixed spider 60.

Receiving tube 54 is mounted upon shaft 56 by means of an arm 62 fixed to shaft 56 as at 64 and a hollow cylindrical drum 66 supported upon shaft 56 adjacent spider 60. Receiving tube 54 is fixedly connected at its respective ends to arm 62 and drum 66 and does not rotate relative to these members. Tube 54 is formed with an axially extending materials receiving opening or slit 68 which extends substantially entirely across the interior of materials flow conduit 50 and faces shaft 56.

Drum 66 is constructed from a pair of circular inner 70 and outer 72 plates which are connected to each other by an annular ring 74. Receiving tube 54 is supported from inner plate 70 as by means of a collar 76 which is secured to the tube and plate by any suitable means such as welding. A plurality of materials discharge openings 78 extend through annular ring 74 for discharging materials from the interior of the drum 66 into a fixed surrounding housing 80 having a discharge chute 82 at its lowermost portion. A counterweight 83 is mounted within the drum to counterbalance the eccentrically mounted tube 54.

Drum 66 is supported upon shaft 56 for rotation within an opening 84 formed in conduit 50. Flow of grain from the interior of conduit 50 through the opening 84 is prevented by extending inner plate 70 of drum 66 outwardly beyond the edges of the opening 84. It will be appreciated that conduit 50 is so shaped in the region of drum 60 as to permit clearance of the drum during rotation and to provide the necessary flat annular surface cooperable with the extended edge of circular plate 70 to achieve the aforementioned sealing characteristic.

A conveying screw 86 is supported for rotation within the interior of tube 54. Screw 86 is journaled at one end into arm 62 as at 88 and is rotatably supported at its opposite end by bushing 90 mounted within outer plate 72 of the drum 66. The shaft of screw 86 projects outwardly through plate 72 and a gear 92 is fixed to the shaft of screw 86 on the outer side of outer plate 72. Gear 92 is meshed with a stationary ring gear 94 fixedly supported upon spider 60 which in turn is bolted to flow conduit 50 as at 96. Thus, upon rotation of drum 66 about the axis defined by shaft 56, the meshing engagement between spur gear 92 and ring gear 94 causes conveying screw 86 to be driven in a direction conveying material disposed within receiving tube 50 to the right (FIG. 4) to discharge the material from the interior of tube 54 into the interior of drum 66.

Rotary movement of drum 66 and the accompanying rotation of receiving tube 54 and arm 62 is accomplished by driving shaft 56 by any suitable means such as a motor schematically illustrated at 98.

In operation, shaft 56 is rotated as by motor M and carries with it in rotation both drum 66 and receiving tube 54. As tube 56 rotates through the lower half of its cycle, opening 68 is moved into facing relationship with the flow of material through conduit 50 and thereby collects a sample of the material. The sample collected is representative of the material flowing through conduit 50 and is representative of the transverse distribution of the material not only across the tube in a direction parallel to shaft 56 i.e. a varied distribution across the tube from left to right in FIG. 5, but also variations in distribution transversely of the tube in a direction perpendicular to the axis of shaft 56—i.e. variations in distribution in material from left to right in FIG. 6.

Because of the fact that materials receiving opening 63 faces the axis of shaft 56 about which tube 54 is rotated, material passing through conduit 50 is uniformly sampled in its extent transversely across the conduit as viewed in FIG. 6. With a flow of material in the direction indicated by arrow G in FIG. 6, the amount of material passing through opening 68 at any given point transversely of conduit 50 is proportional to the effective width of opening 68 $F_0$ divided by the velocity $V_0$ with which this opening is moved past the particular point under consideration. The effective opening $F_0$ is equal to the width of opening 68 F multiplied by the cosine of angle "$a$," while the effective velocity $V_0$ is equal to the actual velocity V multiplied by the cosine of angle "$a$." Thus, the effective opening $F_0$ and effective velocity $V_0$ increase and decrease at the same rate and the ratio $$\frac{F_0}{V_0}$$

is constant. Thus, at positions adjacent the side of conduit 50 in FIG. 6, the effective opening $F_0$ is smallest i.e. the opening transversely across the tube. However, in this position the effective velocity $V_0$ is likewise smallest, and thus the opening takes a longer time to pass the given point under consideration. At locations where the effective opening $F_0$ is largest—that is where it is facing upstream adjacent the center of conduit 50, the velocity $V_0$ is likewise the greatest and the opening moves past a given point under consideration more quickly.

It will be further noted that due to the time required for receiving tube 54 to pass completely across conduit 50, a longitudinally extending sample is extracted from the flowing material.

While I have described but two embodiments of my invention, it will be apparent to those skilled in the art that disclosed embodiments may be modified. Therefore, the foregoing description is to be considered exemplary rather than limiting and the true scope of my invention is that defined in the following claims.

I claim:

1. In an apparatus for handling granular or powdery materials in bulk including conduit means for guiding said materials along a confined flow path; means for sampling materials flowing along said flow path comprising a hollow cylindrical member extending transversely across said flow path in a direction normal to the direction of flow of materials, the diameter of said cylindrical member being relatively small whereby the cross sectional area of said member exposed to the flow of materials along said path constitutes only a minor portion of the total cross sectional area of flow of materials, said member having an elongate axially extending opening therein extending entirely across said flow path, means supporting said cylindrical member for rotation within said conduit means about an axis parallel to the longitudinal extent of said opening to periodically expose said opening to the flow of materials, said means supporting said cylindrical member for rotation comprising a rotatable shaft extending in spaced parallel relationship to the longitudinal axis of said cylindrical member, means mounting said cylindrical member upon said shaft for rotation therewith, a conveying screw supported for rotation coaxially within said cylindrical member for conveying material flowing into the interior of said member through said opening to the exterior of said conduit means, and means operable by the rotation of said cylindrical member about the axis of said shaft for rotating said conveying screw.

2. In an apparatus for handling granular or powdery materials in bulk including conduit means for guiding said materials along a flow path; means for sampling materials flowing along said flow path comprising a shaft supported in said conduit means for rotation about an axis extending perpendicularly through the center of said flow path, a hollow cylindrical member mounted upon said shaft for rotation therewith with the axis of said cylindrical member disposed in spaced parallel relationship with the axis of said shaft, said cylindrical member having an axially extending opening therein extending entirely across said flow path in a first direction and being movable upon rotation of said shaft through an angle of 180° to be carried by said shaft from one side of said flow path to the opposite side of said flow path by movement in a direction perpendicular to the longitudinal extent of said opening, means for continuously rotating said shaft to periodically expose said opening to the flow of material in said conduit means, and means for conducting material received in the interior of said cylindrical member to the exterior of said conduit means.

3. In an apparatus for handling granular or powdery materials in bulk including conduit means for guiding said materials along a flow path; means for sampling materials flowing along said flow path comprising a shaft supported for rotation about an axis extending perpendicularly through the center of said flow path, a hollow tubular member located within said conduit means and having a longitudinal opening extending across said conduit means, means mounting said member upon said shaft with the longitudinal axis of said member in parallel offset relationship to the axis of said shaft with said longitudinally extending opening facing said shaft, means for rotating said shaft to periodically expose said opening to the flow of material in said conduit means, a screw conveyor mounted within said tubular member, and means for rotating said screw conveyor to discharge materials from the interior of said tubular member.

References Cited in the file of this patent

UNITED STATES PATENTS

| | | |
|---|---|---|
| 632,713 | Geissler | Sept. 12, 1899 |
| 1,448,758 | Martin | Mar. 20, 1923 |
| 1,860,107 | Lien | May 24, 1932 |

FOREIGN PATENTS

| | | |
|---|---|---|
| 219,819 | Germany | Mar. 10, 1910 |